United States Patent [19]

Haruta et al.

[11] Patent Number: 5,293,023
[45] Date of Patent: Mar. 8, 1994

[54] LASER IRRADIATION NOZZLE AND LASER APPARATUS USING THE SAME

[75] Inventors: Kohichi Haruta, Sodegaura; Yuichiro Terashi, Chiba, both of Japan

[73] Assignee: Mitsui Petrochemical Industries, Ltd., Tokyo, Japan

[21] Appl. No.: 30,537

[22] Filed: Mar. 12, 1993

[30] Foreign Application Priority Data

Mar. 13, 1992 [JP] Japan .................................. 4-89814

[51] Int. Cl.⁵ .............................................. B23K 26/00
[52] U.S. Cl. .............................. 219/121.6; 219/121.84; 372/108
[58] Field of Search ........... 219/121.6, 121.85, 121.84, 219/121.63, 121.64, 121.67, 121.72; 372/108, 58

[56] References Cited

U.S. PATENT DOCUMENTS

| | | | |
|---|---|---|---|
| 4,774,392 | 9/1988 | Orita | 219/121.63 |
| 5,111,021 | 5/1992 | Jolys et al. | 219/121.6 |
| 5,239,552 | 8/1993 | Okuyama et al. | 372/58 |

Primary Examiner—C. L. Albritton
Attorney, Agent, or Firm—Sherman and Shalloway

[57] ABSTRACT

A laser irradiation nozzle free from clogging, adhesion of metal oxides, directional gas blowing, and oxidation occurring on the weld; yet capable of providing sound bead morphology and a stable weld depth on a workpiece. Accordingly, the laser irradiation nozzle comprises a conical outside nozzle and a conical inside nozzle being arranged as such to give a concentric ring-shaped top, having an assist gas outlet being established between the inside and the outside nozzles, wherein, the distance h between the laser beam focal position on the workpiece and said irradiation nozzle is controlled to a predetermined value, and the ratio of the cross sectional area of the assist gas outlet being as defined between the outside and the inside nozzles to the cross sectional area of the inside concentrical ring defined by the outer diameter of said ring on the nozzle top is also controlled to a predetermined value.

6 Claims, 17 Drawing Sheets

DISTANCE BETWEEN LASER BEAM FOCAL
PLANE OF IMAGE-FORMATION SIDE AND
TOP OF LAZER IRRADIATION NOZZLE ( h )

DISTANCE BETWEEN LASER BEAM FOCAL PLANE OF IMAGE-FORMATION SIDE AND TOP OF LAZER IRRADIATION NOZZLE ( h )

EVALUATION OF NOZZLE CLOGGING

DISTANCE BETWEEN LASER BEAM FOCAL PLANE OF IMAGE-FORMATION SIDE AND TOP OF LAZER IRRADIATION NOZZLE ( h )

DISTANCE BETWEEN LASER BEAM FOCAL
PLANE OF IMAGE-FORMATION SIDE AND
TOP OF LAZER IRRADIATION NOZZLE ( h )

LASER IRRADIATION NOZZLE AND LASER APPARATUS USING THE SAME

BACKGROUND OF THE INVENTION

Laser welding apparatuses are included in the application fields of laser processing. In laser welding, a plasma, which considerably affects the behavior of the molten value, is generated during the process. Accordingly, shield gas is generally blown during the welding to remove the plasma. Furthermore, because fume and sputters adhere to the nozzle to impair the optical system, measures for preventing them from forming have also been studied.

Shield gas blowing can be carried out by either a center gas type process or a side gas type process.

In the center gas type process, as illustrated in FIG. 24, the gas is blown co-axially with the laser beam. This process is mostly used for laser cutting (for example published JP58-2754 and JP59-37159).

In the side gas type process, on the other hand, a gas is blown to the weld through a path other than the laser beam as shown in FIG. 25. This type of gas blowing is carried out using a side nozzle, and is utilized for suppressing the plasma and for improving the welding bead (for example published JP60-32556 and laid opened JP58-168490).

There are also cases in which ring-shaped nozzles are used. Such nozzles are used for concentrating the shield gas, as disclosed in, for example, JP56-151191(laid opened), or for preventing the adhesion of metal melt during cutting, as disclosed, for example, JP03-23275(published).

Useful as the shield gas include gases of rare elements such as Ar, He, Xe, Kr, and Ne; inert gases such as $N_2$; and reactive gases such as $CO_2$ and $H_2$; as well as the gases obtained by mixing two or more gases selected therefrom.

The processes described above, however, suffer problems as follows.

(1) Clogging occurs on the nozzle top, due to the scattered sputter and metal vapor which generate on the welding workpiece;

(2) Bead characteristics in some materials such as aluminum is impaired, because a metal oxide (inclusive of those having a composition deviating from stoichiometry) which generates from the work on laser irradiation to the surface of the workpiece adheres to the bead;

(3) Directivity along the nozzle direction (gas blowing direction) is observed with respect to the direction of laser scanning (welding direction);

(4) Defective bead appearance such as undercuts and humping results under an excessive supply of shield gas which blows down the molten value; materials of low melt viscosity are more apt to suffer this problem;

(5) Unsound solidification structures result under an insufficient amount of shield gas, due to the oxidation of the metal; and (6) Under a favorable blowing of shield gas, the weld depth (penetration) falls at a constant value; otherwise, the weld depth is reduced.

In practicing laser welding, however, the problems above are found to occur concomitantly with each other. Accordingly, it is keenly desired to establish an industrially feasible gas shielding process which overcomes all of the problems enumerated above.

A laser processing process which comprises blowing an inert gas against the laser irradiated portion through a ring-shaped nozzle is disclosed in JP56-151191(laid opened) referred herein before (see FIGS. 2 and 4 attached thereto). In this process, however, no consideration is made on the angle between the inner and the outer nozzles and on the positional relation between the nozzles and the workpiece. Accordingly, the problems (1) to (6) as enumerated above remain yet to be solved.

Similarly, the same problems remain unsolved in the process disclosed in JP03-23275(published).

An object of the present invention is to provide a laser irradiation nozzle free from at least one of the problems above; and a laser irradiation nozzle in which the nozzle clogging is prevented from occurring, in which the adhesion of metal oxides is prevented, which enables a non-directional gas blowing, which provides sound bead morphology, which prevents oxidation from occurring on the weld, and which provides a stable penetration depth of the work.

SUMMARY OF THE INVENTION

The present invention provides a laser irradiation nozzle for use in laser processes such as welding, cutting, perforating, etc., and it comprises an assist gas outlet for blowing an assist gas against the processing object during the laser processing.

The laser irradiation nozzle according to the present invention comprises inside and outside conical nozzles arranged concentrically on the nozzle top, and an assist gas outlet being placed between the inside and the outside nozzles. The structure of the nozzle is described below.

Referring to FIG. 1, the laser irradiation nozzle is shaped, firstly, as such that the ratio $\eta$ (%) (which is sometimes referred to simply as a nozzle area ratio, hereinafter), i.e., the ratio of the cross sectional area ($mm^2$) of the area of the assist gas outlet 3, which is defined as the area between the inside nozzle 2 and the outside nozzle 1, to that of the inside nozzle top 2 as defined by the outer diameter ($mm^2$), may satisfy the relations defined below:

$$\eta \leq -(3/5)h + 36 \quad (1\text{-}1)$$

$$\eta \geq -(3/5)h + 16 \quad (2\text{-}1)$$

$$\eta > 0, h \geq 10$$

wherein, h (mm) is the distance between the laser beam focal plane of image-formation side (position on the workpiece: the just-focused position of the laser beam) and the laser-irradiation nozzle. This distance h may be sometimes referred to simply hereinafter as a distance of the nozzle top.

Secondly, the laser-irradiation nozzle according to the present invention is shaped as such that the outer surface of the inside nozzle 2 is tilted from the vertical axis at a tilt angle $\theta$ (deg) defined by $$\theta = k\theta_o \quad (3)$$

where, $1 \leq k \leq 2$; and $\theta_o$ represents the converging angle of the laser beam defined by the numerical aperture NA of the laser radiation optics as $NA = \sin \theta.\theta_o$ is preferably in the range of from 10 to 30 degrees. Accordingly, the diameter for the outer diameter of the nozzle top of the inside nozzle 2, rin (mm), can be expressed as follows:

$$r_{in} = h \cdot \tan \theta \quad (4)$$

and the cross sectional area as defined by the outer diameter of the top of the inside nozzle 2, $S_o$ (mm$^2$), becomes $$S_o = \pi r_{in}^2 \quad (5)$$

If the value k is smaller than 1, unfavorable phenomena occur because the laser radiation substantially hits the nozzle top to give thermal damages thereto or to lower the laser output power.

If the value k exceeds 2, on the other hand, again there is a tendency to cause, for example, adhesion of metal oxides, impaired appearance of bead morphology, and insufficient penetration depth on the workpiece, as mentioned herein before.

Accordingly, the value of k should be not less than 1 and not higher than 2; more preferably, it is not less than 1.05 and not higher than 1.50.

The cross sectional area as defined by the inner diameter of the top of the outside nozzle 1 S1 (mm$^2$) can be expressed by $$S_1 = \lambda r_{out}^2 \quad (7)$$

where, $r_{out}$ (mm) is the diameter for the inner diameter of the top of the outside nozzle 1.

Furthermore, the ratio $\eta$ (%) defined by the ratio of the cross sectional area of the space between the top of the inside nozzle 2 and the top of the outside nozzle 1, $\Delta S$ (mm$^2$), to the cross sectional area defined by the outer diameter of said top of the inside nozzle 2, $S_o$ (mm$^2$), can be expressed by $$\eta = \Delta S / S_o = (S_1 - S_o)/S_o \times 100 \quad (8)$$

Furthermore, it is preferred that the laser irradiation nozzle of the present invention is shaped as such that it satisfies the relations as follows to prevent nozzle top from suffering clogging, to obtain a sound bead morphology, to obtain a sufficient penetration depth, and the like.

$$\eta \leq -(3/5)h + 34 \quad (1\text{-}2)$$

$$\eta \geq -(3/5)h + 19 \quad (2\text{-}2)$$

$$\eta \geq 2.5, h \geq 15$$

Furthermore, to achieve a laser irradiation nozzle according to the present invention further effective for, for example, preventing the adhesion of metal oxides, obtaining non-directional gas blowing, preventing oxidation of the metal melt, and obtaining sufficient weld depth, the shape of said nozzle most preferably satisfy the relations as follows $$\eta \leq -(3/5)h + 34 \quad (1\text{-}2)$$

$$\eta \geq -(3/5) + 19 \quad (2\text{-}2)$$

$$25 \geq h \geq 15$$

A laser irradiation nozzle having the ratio $\eta$ (%) as specified above can be obtained by simply processing the outside accurately to the defined $\Delta S$ value without any restriction on which method to take for realizing the specified dimension. Referring to FIG. 3, in a simple bilayered nozzle having a laser irradiation outlet 10, the diameter for the inner diameter of the outside nozzle $r_{out}$ may be processed to satisfy $$r_{out} = (S_1/\pi)^{\frac{1}{2}}$$

Otherwise, a spacer 11 may be inserted between the inside and the outside nozzles 2 and 1 while maintaining the $r_{out}$ constant.

In the laser irradiation nozzles according to the present invention, it is preferred that the assist gas is supplied from the assist gas outlet at a flow rate of 10 l/min or higher.

Preferred materials for the inside and outside nozzles of the laser irradiation nozzles according to the present invention include an alloy containing a transition metal as the principal component, such as an aluminum (Al) alloy, a copper (Cu) alloy, a carbon steel, a stainless steel, a titanium (Ti) alloy, a magnesium (Mg) alloy, and a molybdenum (Mo) alloy: or a composite material based on the alloys above, having rendered heat resistant and hardened by providing thereon a coating of a metallic material (e.g., W, Ta, Mo, and V), or a ceramic material (e.g., an oxide, a nitride, a boride, etc., of the metals above), by a method such as spraying, CVD (chemical vapor deposition), PVD (physical vapor deposition), and nitriding or carburizing.

The laser irradiation nozzle according to the present invention can be manufactured at a low cost machining such as cutting using the materials enumerated above.

The weld materials to be used in the present invention include an alloy containing a transition metal as the principal component, such as an Al alloy, a Cu alloy, an alloy steel, a carbon steel, a stainless steel, a nickel (Ni) alloy, a zinc (Zn) alloy, an Mg alloy, a Mo alloy, and a Ti alloy.

As mentioned in the foregoing, the present provides a laser irradiation nozzle having a specified distance between the focal point of the laser beam with respect to the work and the nozzle top, and a specified ratio of the cross sectional area of the space between the top of the inside nozzle and the top of the outside nozzle 1, from which the assist gas is supplied, to the cross sectional area defined by the outer diameter of said top of the inside nozzle. The laser irradiation nozzle according to the present invention having the structure above enables an assist gas blowing having no directionality and which provides a sound bead morphology, welds free from oxidation, and keeping sufficient depth. In particular, the use of the laser irradiation nozzle according to the present invention on an assist gas blowing process effectively prevents the nozzle from clogging and adhesion of metal oxides.

BEST MODES IN PRACTICING THE INVENTION

Figure 23:
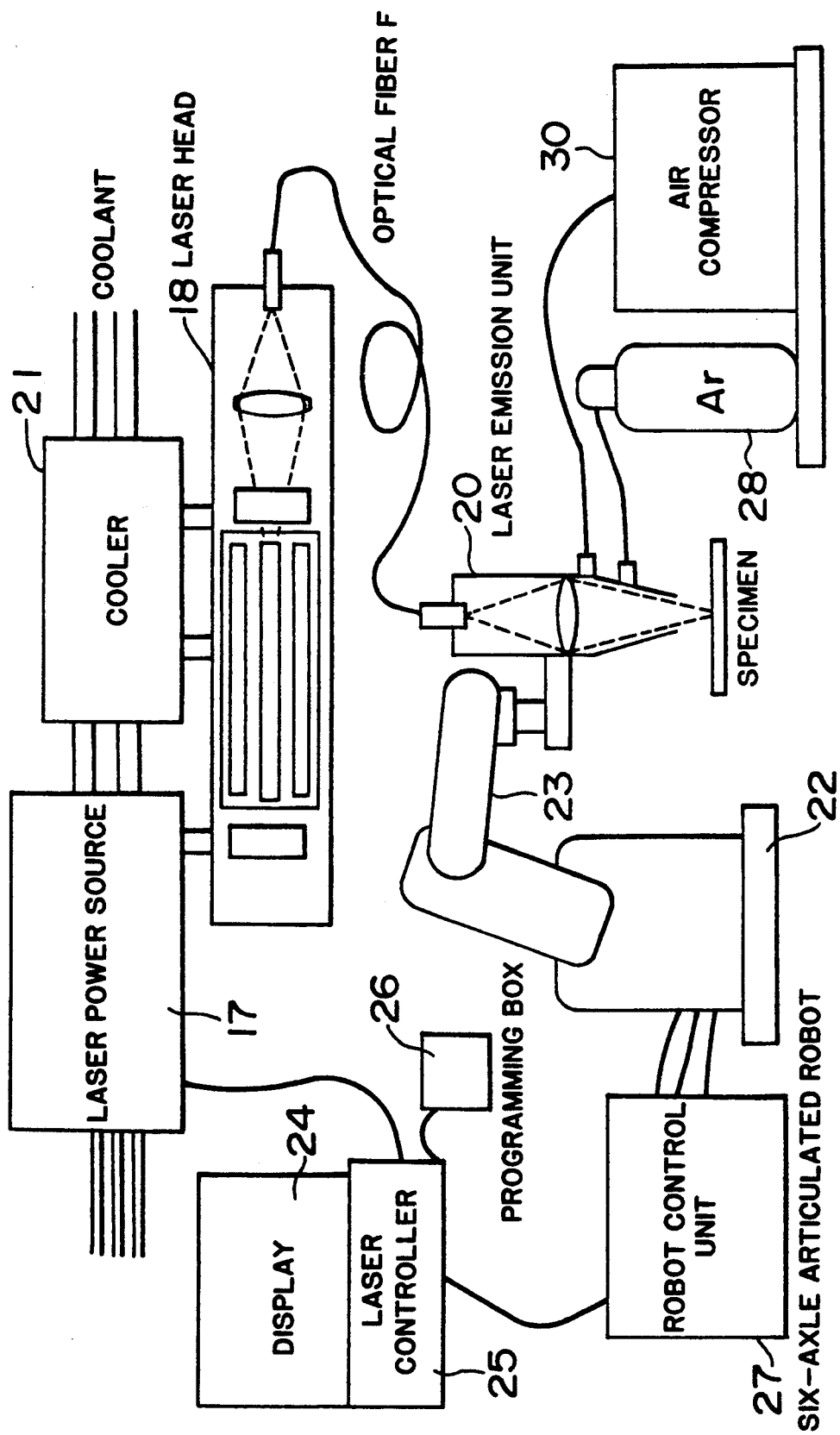
FIG. 23 is an explanatory figure showing the entire structure of the laser apparatus according to an embodiment of the present invention.

Referring to FIG. 23, the entire structure of the laser apparatus according to the present invention is explained below.

A laser power source 17 supplied with an AC of 400 V supplies a predetermined electric power to a laser head 18, and the laser beam having generated from the laser head 18 at a predetermined frequency is introduced to a laser emission unit (laser irradiation nozzle) 20 via an optical fiber F.

The laser power source 17 and the laser head 18 are chilled by circulating a coolant providing from a cooler 21 to prevent the laser power source and the laser head from being overheated.

The movement of the irradiating unit 20 along the XYZ directions and the $\theta$ angular direction is controlled by a driving stage 22 and an arm 23. The driving stage 22 and the arm 23 are controlled by a control system comprising a display 24, a laser controller 25, a programming box 26, and a robot control unit 27.

Furthermore, an assist gas (Ar gas) source 28 and an air compressor 30 are connected to the top of the laser emission unit 20. The structure of the top of the irradiation unit 20, i.e., the structure of the irradiation nozzle, is described in further detail below referring to FIGS. 1 to 5.

Figure 5:
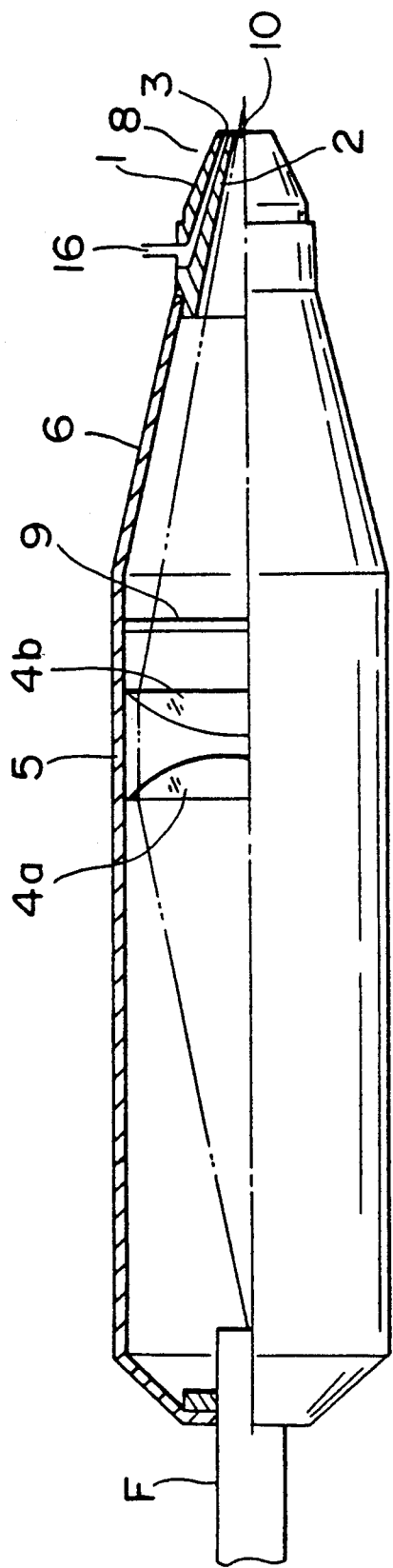
FIG. 5 is a cross sectional view showing a half of the laser emission unit of a laser irradiation nozzle according to an embodiment of the present invention.

In FIG. 5 is shown a laser irradiation nozzle according to an Example, having a structure characteristic to the present invention. The laser emission unit 20 is connected to the top of the optical fiber F.

Figure 1:
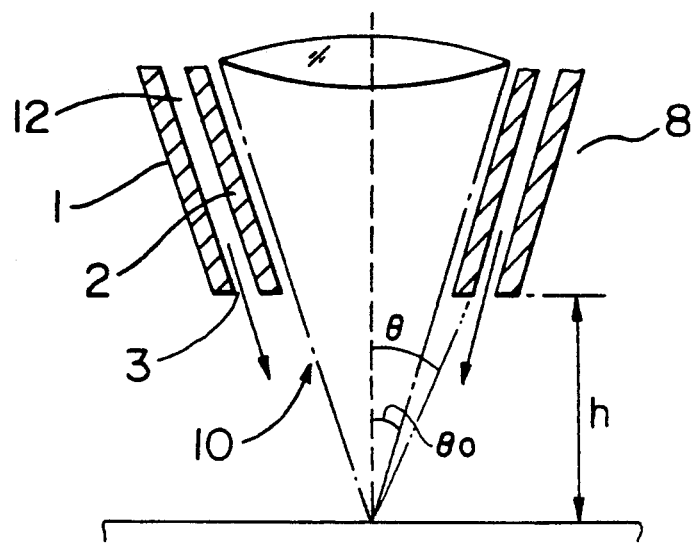
FIG. 1 is a cross sectional view of the nozzle top of a a laser irradiation nozzle according to an embodiment of the present invention.
Figure 2:
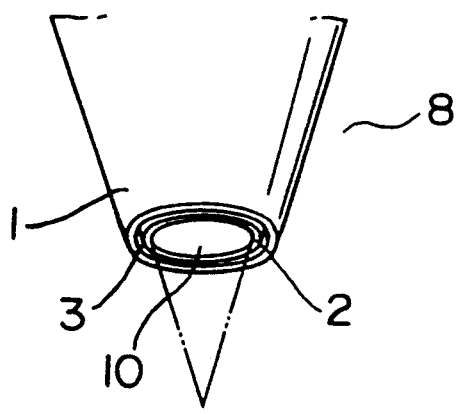
FIG. 2 is a perspective view of the nozzle top of a laser irradiation nozzle according to an embodiment of the present invention.
Figure 3:
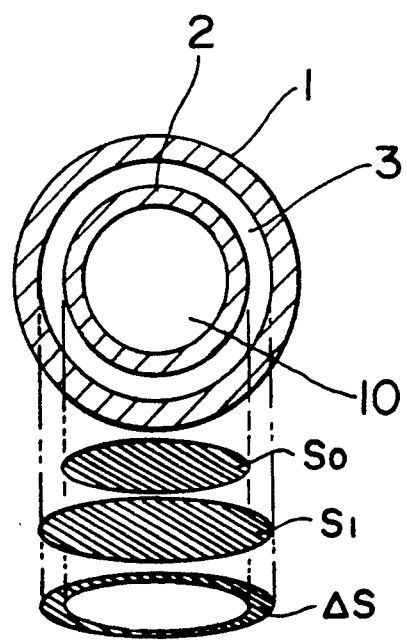
FIG. 3 is a cross sectional view of the nozzle top of a laser irradiation nozzle according to an embodiment of the present invention.

The present unit includes two internal lenses 4a and 4b inside the cylindrical shell 5, and a cylinder top 6 being joined to the cylindrical shell 5. Further to the cylinder top 6 is provided a tapered nozzle portion 8. As shown in FIGS. 1 and 2, the nozzle portion 8 comprises a conical outside nozzle 1 and an inside nozzle 2 being arranged concentrically, to provide a double layered trapezoid structure, i.e., a cone having its head cut with a plane at a certain distance from the top. In this manner, an assist gas outlet 3 for ejecting the assist gas (against the surface of the weld specimen) can be opened between the outside nozzle 1 and the inside nozzle 2. Furthermore, a laser emission outlet 10 is opened at the top of the inside nozzle 2 to emit therefrom a laser beam having concentlated by the lenses 4a and 4b.

Among the two nozzles constituting the whole double layered concentrical trapezoid nozzle, the inside nozzle 2 has an inner shape being machined into a hemispherical cone, such that the inner side may not interfere with the path of the laser beam. On the other hand, the outside nozzle is shaped into a cone having its outer plane being tilted at an angle of $\theta$ with respect to the center axis thereof, and an apex of the cone corresponding to the focal point of the laser beam.

A gas flow path 12 which connects the assist gas source with the assist gas outlet 3 via a gas introduction portion 16 is defined between the outside nozzle 1 and the inside nozzle 2.

Furthermore, a transparent protective glass 9 is inserted between the laser emission outlet 10 the lense 4b.

The laser emission unit as described above was used in an experimental welding. A laser apparatus equipped with a pulsed YAG laser (wavelength: 1.06 $\mu$m) operating in multi-mode at an average power output of 480 W and at a repetition of 8 pps was used in the experiment.

An optical system having a focal length f of 120 mm, a converging angle of $\theta_o$ of 14.5° (where, numerical aperture NA=sin $\theta_o$), and a just-focus position of the laser beam being adjusted to the specimen.

The specimen used in the welding was prepared by welding two lap-jointed JIS A5052 sheets, each 100 mm in length, 30 mm in width, and 1.0 mm in thickness. The welding was conducted at a welding rate of 50 cm/min for a length of 20 mm, using argon (Ar) as the assist gas.

In the present invention, k=1.05 was selected for the equation (3). The distance between the laser beam focal plane of image-formation side and the top of the nozzle h was changed, and the nozzle area ratio $\eta$(%) was varied accordingly for each of the changed h values to observe the influence on the shape of weld beads with the changing parameters. More specifically, the value h was varied in 6 levels, i.e., 5, 10, 20, 30, 40, and 50 mm. The $\eta$(%) was varied for each of the h values in 5 levels to prepare 30 types in total of laser irradiation nozzles. The rate of the assist gas flow was varied in the range of from 0 to 40 l/min.

The weld beads were evaluated for the following items: external appearance of the bead shape such as disturbed bead shape; adhesion of the metal oxide to the surface of the specimen; oxidation degree of the surface of the specimen; clogging of the top of the laser irradiation nozzle due to the formation of sputters and fume; and the influence on the weld depth.

The evaluation results obtained under an assist gas flow rate of 20 l/min are shown below.

(1) Evaluation of the bead shape.

Each of the weld beads obtained under various conditions was evaluated for the external appearance such as whether there is observed a disturbance in bead shape. The results are summarized in FIG. 6.

Figure 6:
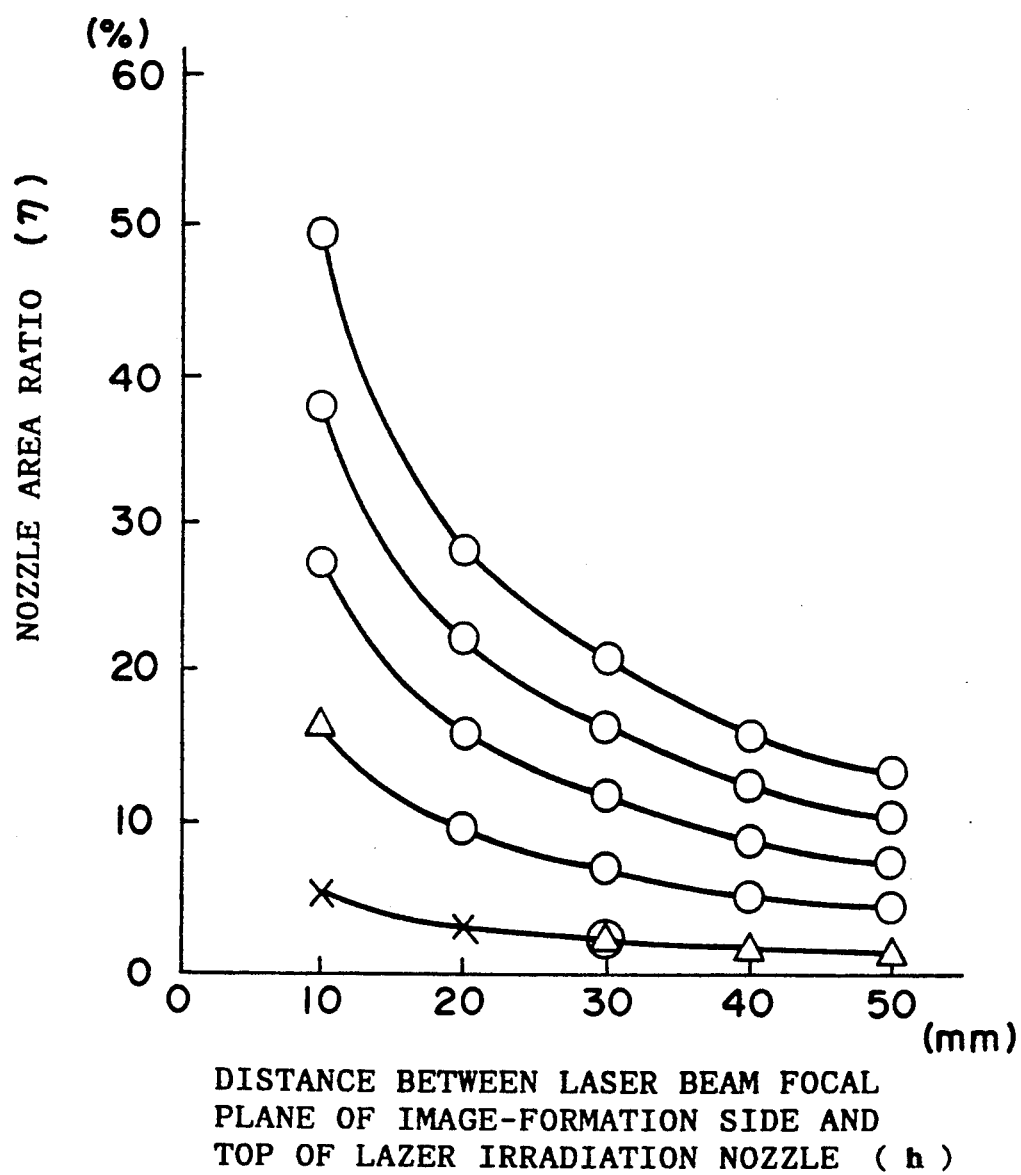
FIG. 6 is a graph showing the evaluation of bead shapes obtained in the Examples of laser welding.
Figure 11:
FIG. 11 is showing the state of the metal surface of the specimen obtained by laser welding according to an Example.

In FIG. 6, the conditions marked with × correspond to unfavorable ones under which disordering of molten metal due to excessively high flow rate, i.e., humping beads, and undercuts of the beads are observed; the external appearance of such beads can be observed in FIG. 11.

Figure 12:
FIG. 12 is showing the state of the metal surface of the specimen obtained by laser welding according to an Example.
Figure 13:
FIG. 13 is showing the state of the metal surface of the specimen obtained by laser welding according to an Example.

Those marked with Δ are acceptable conditions, under which some undercuts may be observed on the bead, but rather, under which a somewhat humping bead appearance; this can be observed in FIG. 12. Those marked with ○ are favorable conditions under which favorable bead shapes can be observed as shown in the photograph of FIG. 13.

(2) Evaluation of the adhesion of metal oxides

Figure 7:
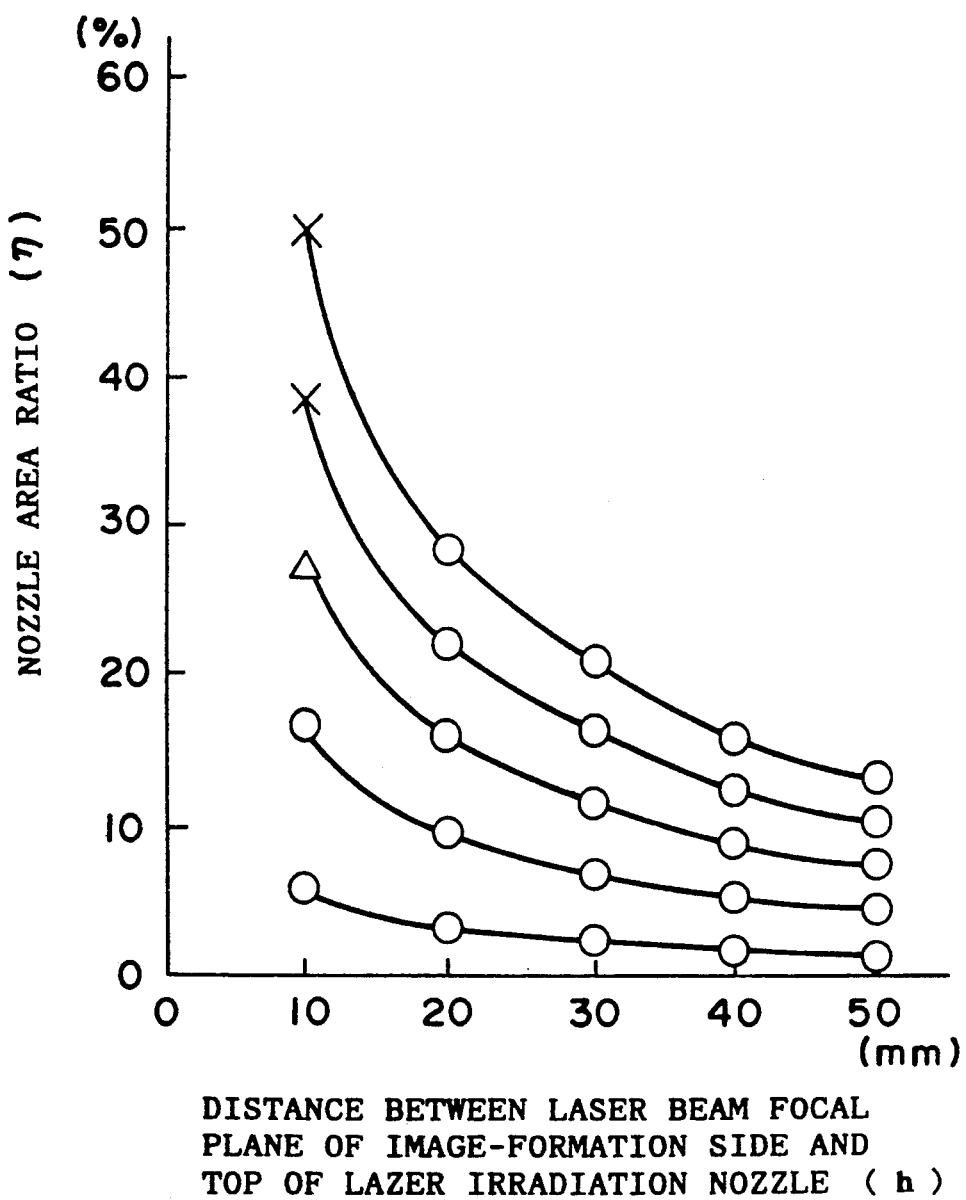
FIG. 7 is a graph showing the evaluation of adhesion states of metal oxides observed in the Examples of laser welding.
Figure 14:
FIG. 14 is showing the state of the metal surface of the specimen obtained by laser welding according to an Example.
Figure 15:
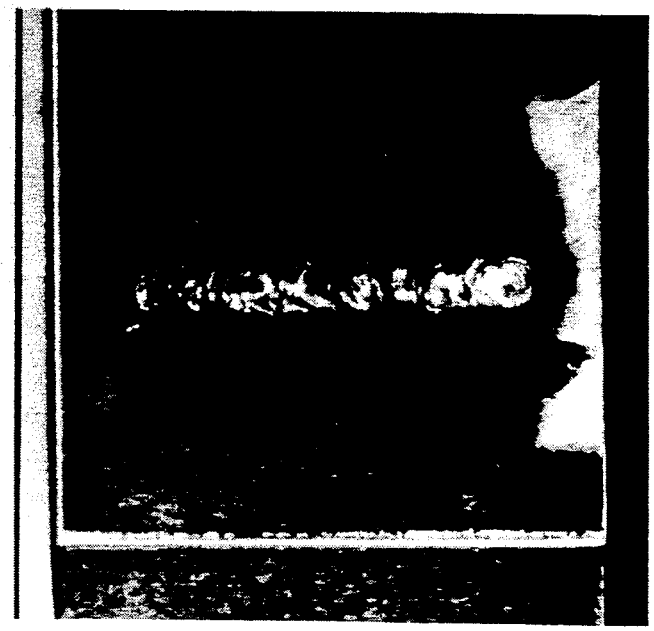
FIG. 15 is showing the state of the metal surface of the specimen obtained by laser welding according to an Example.
Figure 16:
FIG. 16 is showing the state of the metal surface of the specimen obtained by laser welding according to an Example.

The results for the evaluation of the adhesion of metal oxides under each of the welding conditions enumerated above are summarized in FIG. 7. The conditions marked with × correspond to unfavorable ones under which the adhesion of a considerable amount of black colored metal oxides over a wide area is observed; the external appearance of such beads can be observed in the photograph given in FIG. 14. Those marked with Δ are acceptable conditions, under which beads having metal oxides adhered over a reduced area as compared to those observed under conditions marked with × are obtained; this can be observed in the photograph of FIG. 15. Those marked with ○ are favorable conditions under which favorable bead appearances having little adhesion of metal oxides can be observed, as shown in the photograph of FIG. 16.

(3) Evaluation of the degree of surface oxidation

Figure 8:
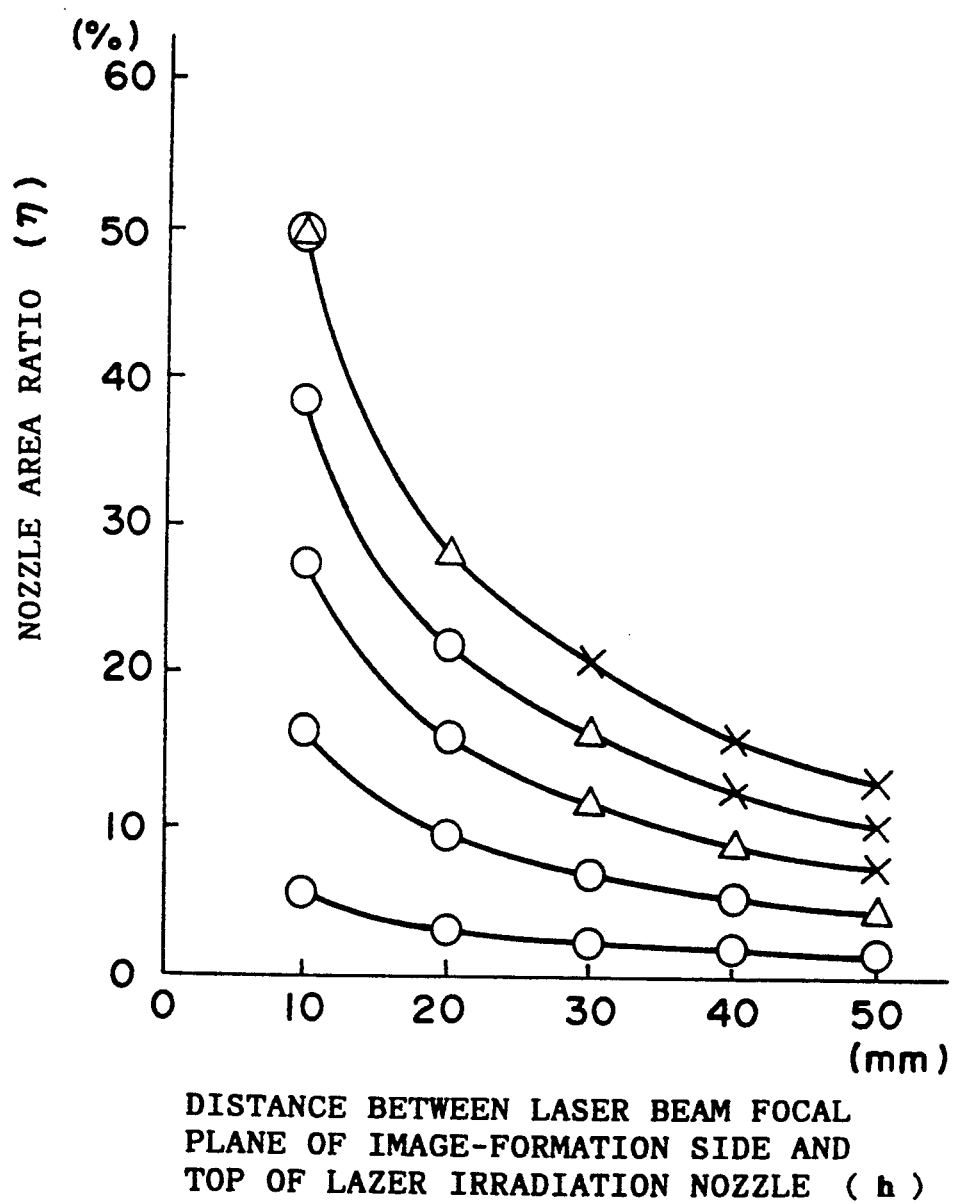
FIG. 8 is a graph showing the evaluation of surface states of metal oxides observed in the Examples of laser welding.
Figure 17:
FIG. 17 is showing the state of the metal surface of the specimen obtained by laser welding according to an Example.
Figure 18:
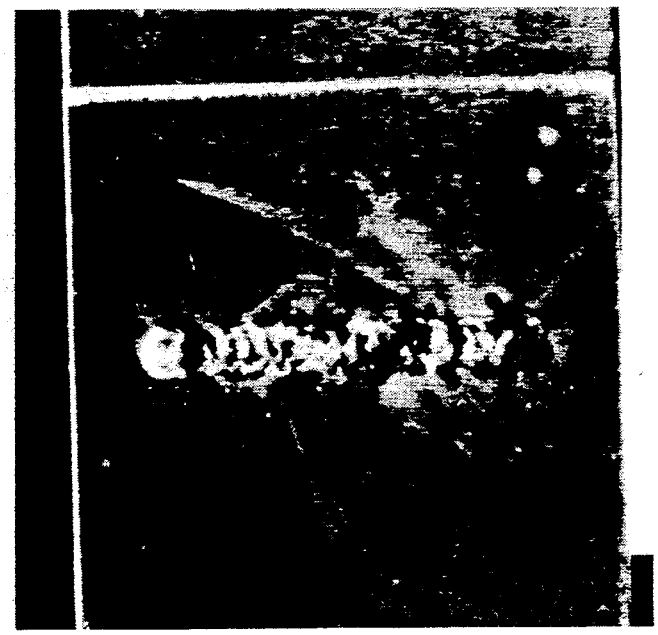
FIG. 18 is showing the state of the metal surface of the specimen obtained by laser welding according to an Example.
Figure 19:
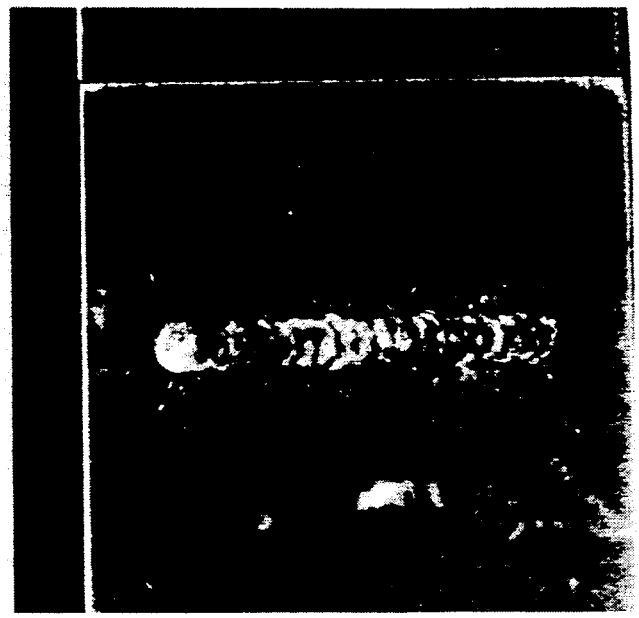
FIG. 19 is showing the state of the metal surface of the specimen obtained by laser welding according to an Example.

The evaluation results under each of the welding conditions are summarized in FIG. 8. The conditions marked with × correspond to unfavorable ones under which a considerable amount of white colored surface oxidized region is observed to spread over a wide area; the external appearance of such beads can be observed in the photograph given in FIG. 17. Those marked with Δ are acceptable conditions, under which beads having an oxidized region being spread over a reduced area as compared to those observed under conditions marked with × are obtained; this can be observed in the photograph of FIG. 18. Those marked with ○ are favorable conditions under which favorable bead appearances having little formation of oxidized are obtained, as shown in the photograph of FIG. 17.

(4) Evaluation of the degree of clogging of the laser irradiation nozzle

Figure 9:
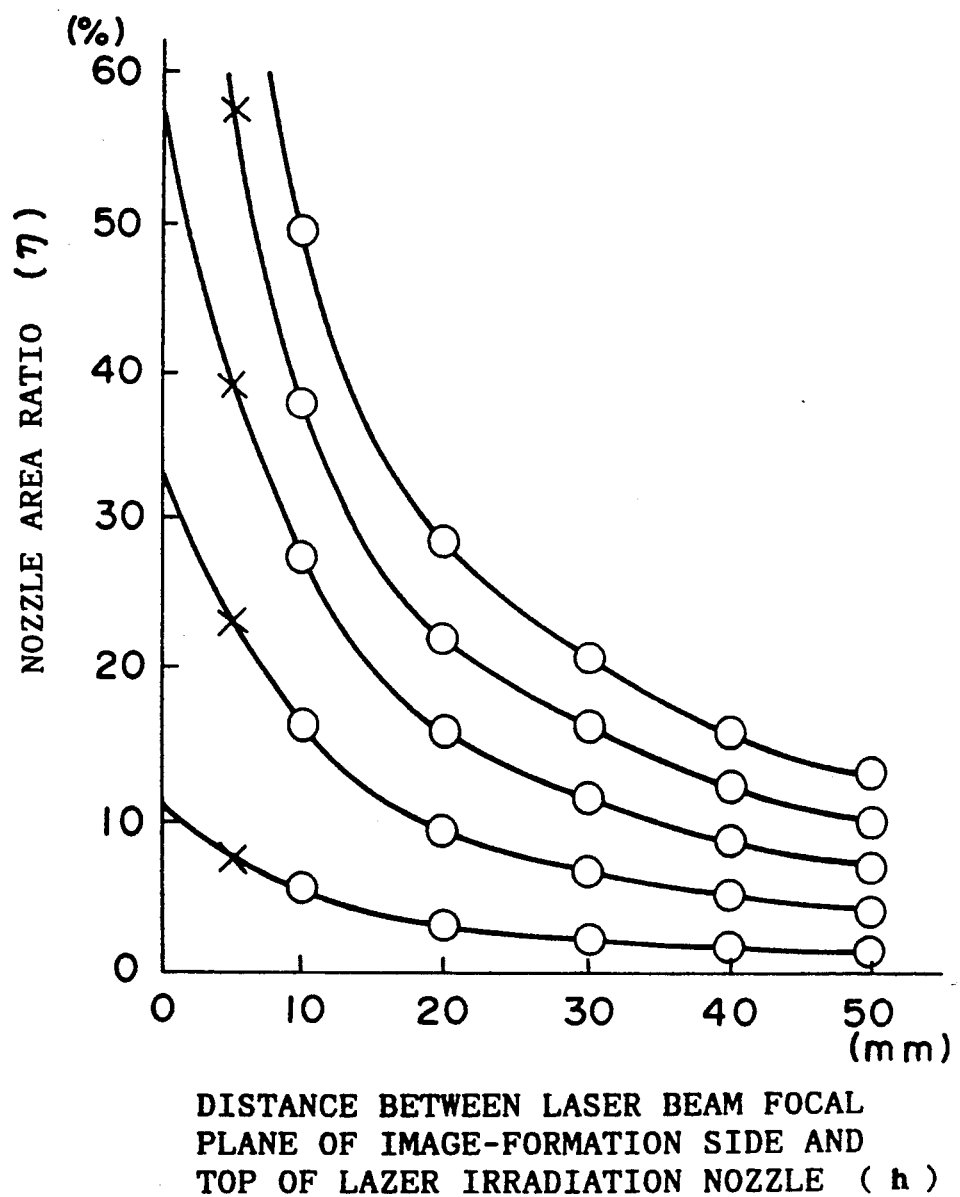
FIG. 9 is a graph showing the evaluation of nozzle clogging observed in the Examples of laser welding.

The evaluation results under each of the welding conditions are summarized in FIG. 9. The conditions marked with × correspond to unfavorable ones under which the weld sputters and fume are observed to adhere to the top of the laser irradiation nozzle; under such conditions, the top of the nozzle suffer inconveniences such as clogging due to the sputters and the like, which leads to a disturbed assist gas ejection, or, even worse, to a complete cease of the assist gas flow. Those marked with ○ are favorable conditions under which no adhesion of weld sputters and fume is observed.

(5) Evaluation of penetration depth

The influence on the weld depth was evaluated under each of the weld conditions above, but no influence was observed on the penetration depth under any of the conditions.

Figure 10:
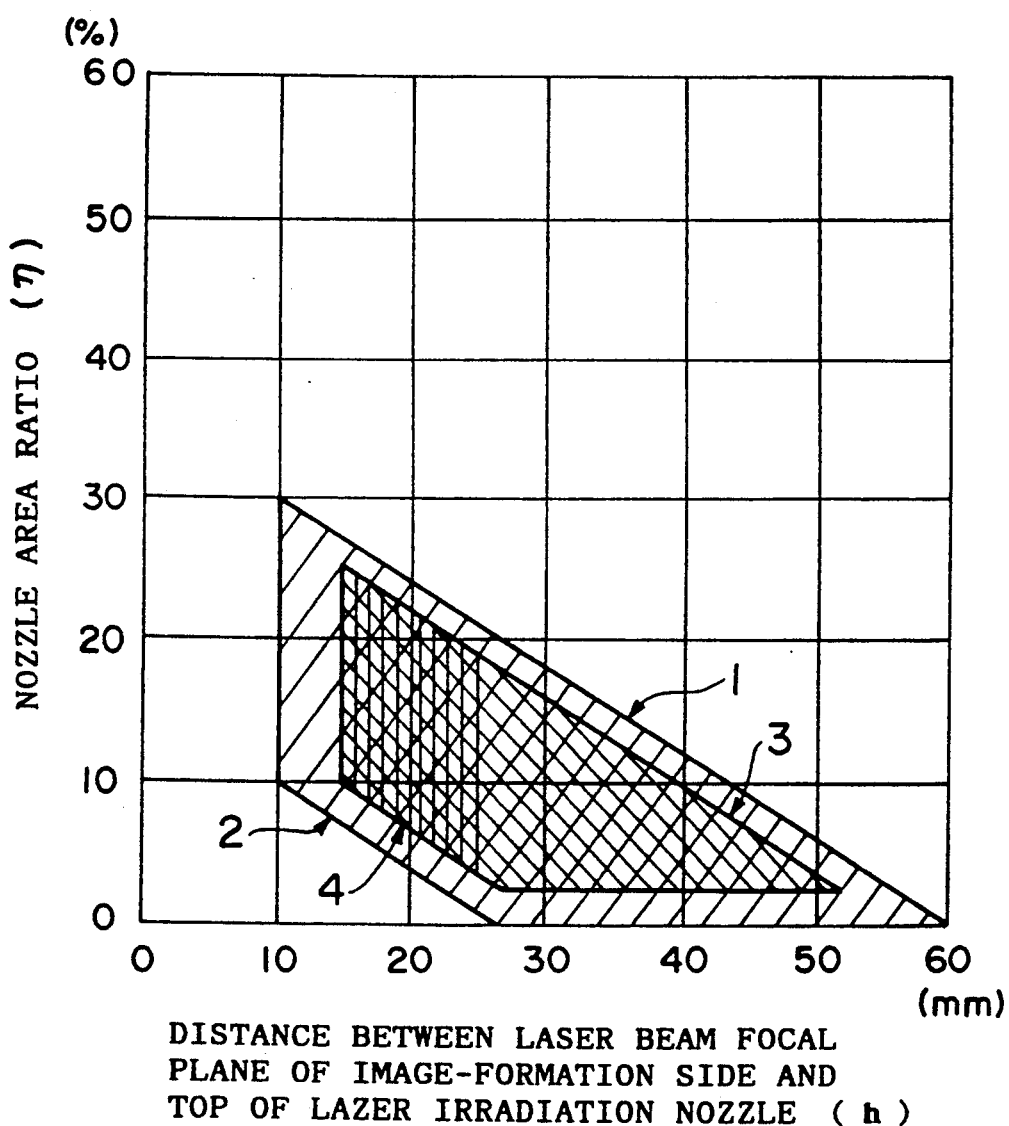
FIG. 10 is a diagram showing the relation between the nozzle area ratio n and the distance h from the nozzle top to the work for the laser irradiation nozzles according to the present invention.

In FIG. 10 is shown the total evaluation for the results obtained herein before. The region I is defined by:

$$\eta \leq -(3/5)h + 36 \qquad (1\text{-}1)$$

$$\eta \geq -(3/5)h + 16 \qquad (2\text{-}1)$$

$$\eta > 0, h \geq 10$$

region II is defined by:

$$\eta \leq -(3/5)h + 34 \qquad (1\text{-}2)$$

$$\eta \geq -(3/5)h + 19 \qquad (2\text{-}2)$$

$$\eta \geq 2.5, h \geq 15$$

and region III is defined by:

$$\eta \leq -(3/5)h + 34 \qquad (1\text{-}2)$$

$$\eta \geq -(3/5) + 19 \qquad (2\text{-}2)$$

$$25 \geq h \geq 15$$

The figure reads that a favorable result can be obtained under any of the conditions falling in the area marked with I, that a more favorable result can be obtained under a condition in the area marked with II, and that a most favorable result is obtained with an excellent bead appearance by selecting a condition falling in the area marked with III. It has been also confirmed that the nozzle is non-directional under any condition falling in the regions defined above.

Furthermore, the flow rate of the assist gas was varied for each of the welding conditions above. It was confirmed that the regions defined above can be conducted without any problem by setting the rate to 10 l/min or higher.

Figure 4:
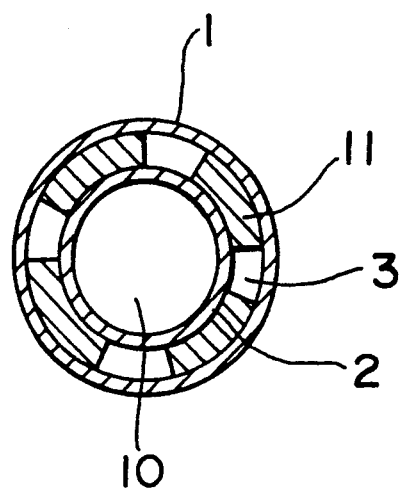
FIG. 4 is a cross sectional view of the nozzle top of a laser irradiation nozzle according to another embodiment of the present invention.

Similar results were obtained on nozzles having a constant diameter $r_{out}$ for the inner diameter of the outside nozzle but with inserts made of differing materials such as a metal, a ceramics, and a heat resistant plastic, being incorporated between the inside and the outside nozzles 1 and 2, as illustrated in FIG. 4.

COMPARATIVE EXAMPLE 1

Figure 22:
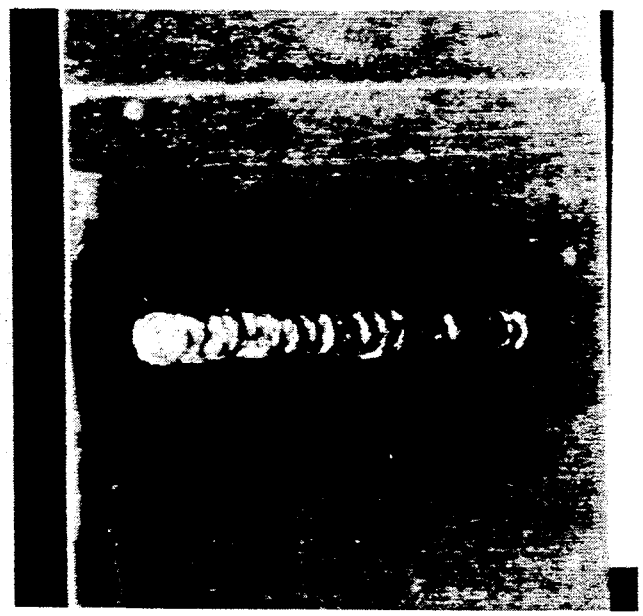
FIG. 22 is showing the state of the metal surface of the specimen obtained by laser welding according to Comparative Example 1.

The result obtained through a welding experiment using a coaxial nozzle having a nozzle top distance h of 5 mm is shown in the photograph of FIG. 22. The flow rate of the assist gas was varied in the same manner as in the Example described above, but only an unfavorable external appearance was observed for all of the cases with a considerable amount of metal oxides being adhered over a large area of the weld surface.

COMPARATIVE EXAMPLE 2

Figure 24:
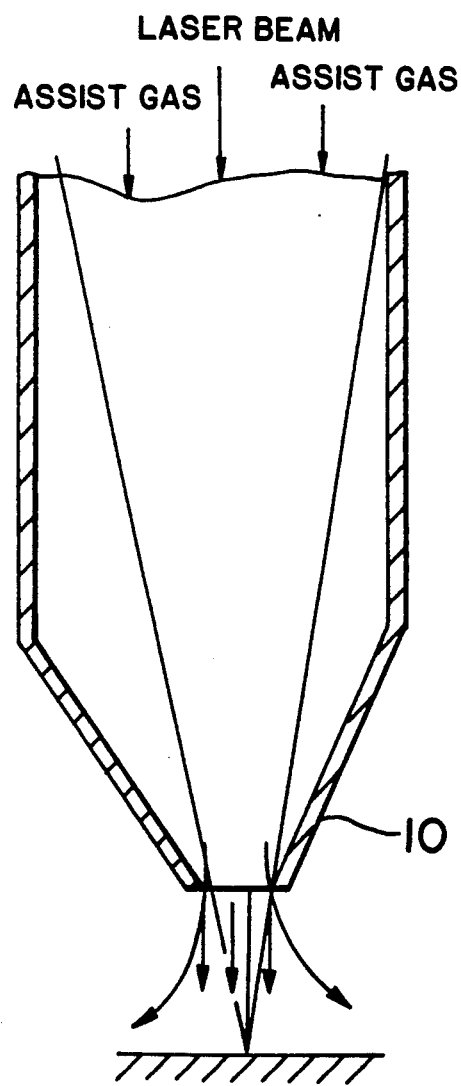
FIG. 24 is an explanatory figure showing the structure of the nozzle top of an irradiation nozzle of a center gas type used in Comparative Example 2.

An welding experiment under an assist gas was conducted using a nozzle of a center gas type, as illustrated in FIG. 24. The result is shown in the photograph of FIG. 20.

Figure 20:
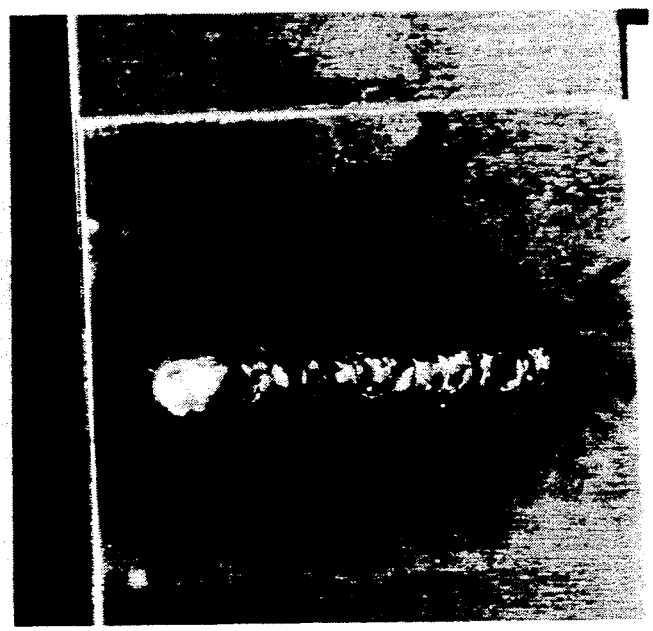
FIG. 20 is showing the state of the metal surface of the specimen obtained by laser welding according to Comparative Example 2.

FIG. 20 reads that even though the flow rate of the assist gas is varied in the same manner as in the Example described above, an unfavorable external appearance only can be observed for all of the cases with a considerable amount of metal oxides being adhered over a large area of the weld surface.

COMPARATIVE EXAMPLE 3

Figure 21:
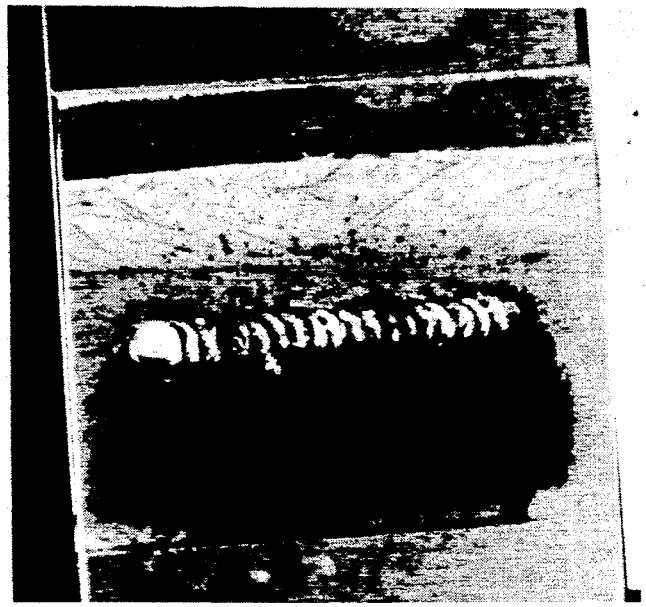
FIG. 21 is showing the state of the metal surface of the specimen obtained by laser welding according to Comparative Example 3.
Figure 25:
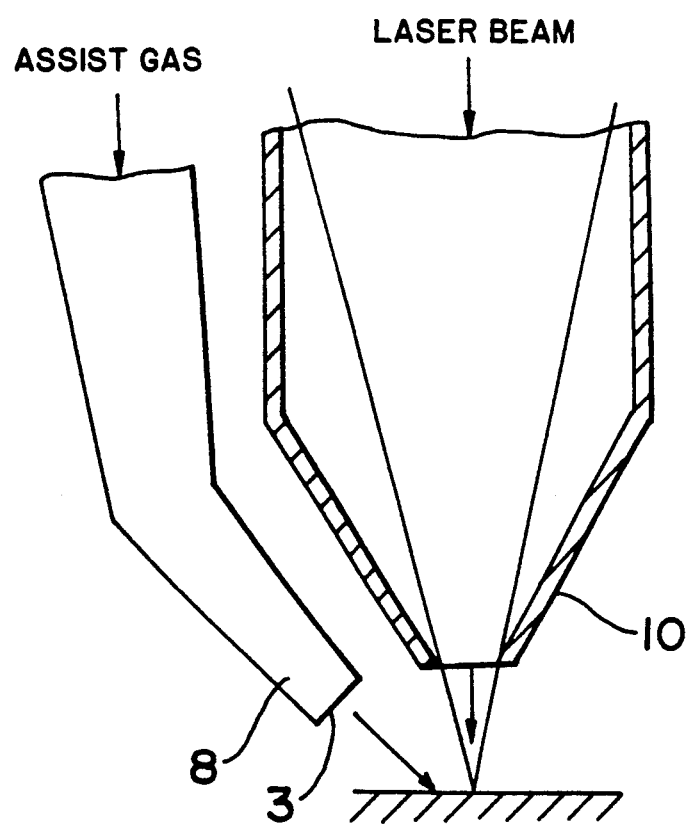
FIG. 25 is an explanatory figure showing the structure of the nozzle top of an irradiation nozzle of a side gas type used in Comparative Example 3.

An welding experiment under an assist gas was conducted using a nozzle of a side gas type, as illustrated in FIG. 25. The result is shown in the photograph of FIG. 21.

It can be seen that in the present comparative example again, an unfavorable external appearance only can be observed for all of the cases with a considerable amount of metal oxides being adhered over a large area of the weld surface, even though the flow rate of the assist gas is varied in the same manner as in the Example described above.

While the invention has been described in detail and with reference to specific examples thereof, it will be apparent to one skilled in the art that various changes and modifications can be made therein without departing from the spirit and scope thereof.

What is claimed is:

1. A laser irradiation nozzle comprising a conical outside nozzle and a conical inside nozzle for irradiating a laser beam being arranged concentrically to provide a concentrical ring-shaped nozzle top, having provided between said inside and outside nozzles an assist gas outlet to eject therefrom an assist gas, wherein, the outer surface of the inside nozzle is tilted from the vertical axis at a tilt angle $\theta$ (deg) defined by $\theta = k\theta_o$ (where, $1 \leq k \leq 2$), where $\theta_o$ represents converging angle of laser beam is obtained from the numerical aperture of the laser, NA, as $NA = \sin\theta_o$, and the laser irradiation nozzle is shaped as such that the ratio $\eta(\%)$ of the cross sectional area (mm$^2$) of the assist gas outlet, which is defined by the area between the inside nozzle and the outside nozzle, to that of the top of the inside nozzle as defined by the outer diameter (mm$^2$), may satisfy the relations defined:

$$\eta \leq -(3/5)h + 36$$

$$\eta \geq -(3/5)h + 16$$

$$\eta > 0, h \geq 10$$

where, h (mm) is the distance between the laser beam focal plane of image-formation side and the top of the laser irradiation nozzle.

2. A laser irradiation nozzle as claimed in claim 1, wherein the laser irradiation nozzle is shaped as such that the ratio $\eta(\%)$ satisfies the following relations $$\eta \leq -(3/5) + 34$$

$$\eta \geq -(3/5) + 19$$

$$\eta \geq 2.5, h \geq 15$$

3. A laser irradiation nozzle as claimed in claim 2, wherein the laser irradiation nozzle is shaped as such that the ratio $\eta(\%)$ satisfies the following relations $$\eta \leq -(3/5)h + 34 \qquad (1\text{-}1)$$

$$\eta \geq -(3/5)h + 19 \qquad (2\text{-}1)$$

$$25 \geq h \geq 15.$$

4. A laser irradiation nozzle as claimed in claim 1, wherein the assist gas is flown from the assist gas outlet at a flow rate of 10 l/min or higher.

5. A laser irradiation nozzle as claimed in claim 1, wherein the value k is in the range of from 1.05 to 1.50.

6. A laser apparatus equipped with a laser irradiation nozzle, said laser irradiation nozzle comprising:

a conical outside nozzle and a conical inside nozzle for irradiating a laser beam being arranged concentrically to provide a concentrical ring-shaped nozzle top, having provided between said inside and outside nozzles an assist gas outlet to eject therefrom an assist gas, wherein, the outer surface of the inside nozzle is tilted from the vertical axis at a tilt angle $\theta$ (deg) defined by $\theta = k\theta_o$ (where, $1 \leq k \leq 2$), where $\theta_o$ is obtained from the numerical aperture of the laser, NA, as $NA = \sin\theta_o$, and the laser irradiation nozzle is shaped as such that the ratio $\eta(\%)$ of the cross sectional area (mm$^2$) of the assist gas outlet, which is defined by the area between the inside nozzle and the outside nozzle, to that of the top of the inside nozzle as defined by the outer diameter (mm$^2$), may satisfy the relations defined:

$$\eta \leq -(3/5)h + 36$$

$$\eta \geq -(3/5)h + 16$$

$$\eta > 0, h \geq 10$$

where, h (mm) is the distance between the laser beam focal plane of image-formation side and the top of the laser irradiation nozzle.

* * * * *